United States Patent
McClure

[15] 3,703,803
[45] Nov. 28, 1972

[54] MOBILE VARIABLE HEAD, HEDGE TRIMMER

[72] Inventor: James N. McClure, Box 64, Oklaunion, Tex. 76373

[22] Filed: Jan. 31, 1972

[21] Appl. No.: 222,064

[52] U.S. Cl..................................................56/237
[51] Int. Cl. ............................................A01d 55/00
[58] Field of Search........56/233, 234, 235, 236, 237, 56/17.6, 17.1, 16.7

[56] References Cited

UNITED STATES PATENTS

| | | | |
|---|---|---|---|
| 1,627,258 | 5/1927 | Sullivan | 56/233 |
| 1,839,009 | 12/1931 | Bankson | 56/237 |
| 1,857,342 | 5/1932 | Albrecht | 56/237 |
| 1,869,394 | 8/1932 | Sikma | 56/235 |
| 1,930,934 | 10/1933 | Healy | 56/237 |
| 2,082,610 | 6/1937 | Bankson | 56/237 |
| 2,762,186 | 9/1956 | Janata | 56/233 |
| 2,798,354 | 7/1957 | O'Brien et al. | 56/235 |
| 3,433,005 | 3/1969 | Deigaard et al. | 56/235 |
| 3,597,908 | 8/1971 | Schaefer | 56/233 |

*Primary Examiner*—Russell R. Kinsey

[57] ABSTRACT

A device for trimming hedges. This device consists primarily of a power driven base with elevatable portions for raising and lowering the trimmer head containing a shears.

4 Claims, 3 Drawing Figures

MOBILE VARIABLE HEAD, HEDGE TRIMMER

This invention relates to hedge trimming devices, and more particularly to a variable hedge trimmer.

It is therefore the primary purpose of this invention to provide a hedge trimmer apparatus which will have a U-shaped member to which is mounted adjustable members for raising and lowering the head portion containing the shears.

Another object of this invention is to provide a hedge trimming apparatus which will be powered so that it will be mobile as the shears trim the hedges.

Another object of this invention is to provide a hedge trimming apparatus which will have adjustment means for the head trimmer to be positioned in a vertical position for trimming the sides of the hedges as well as the top of the hedges.

A still further object of this invention is to provide a hedge trimming apparatus which will have adjustable members carried upon the U-shaped member that will have set screw means for securing the device at any desired elevation.

Other objects of the present invention are to provide a variable head, hedge trimmer which is simple in design, inexpensive to manufacture, rugged in construction, easy to use and efficient in operation.

These and other objects will be readily evident upon a study of the following specification and the accompanying drawing wherein.

Figure 2:
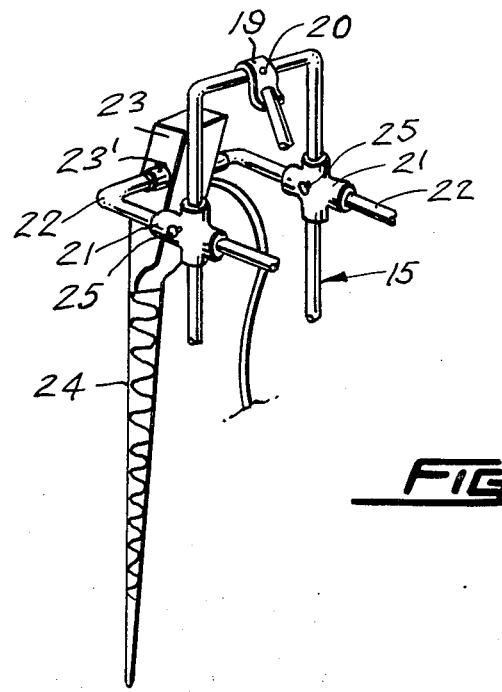
FIG. 2 is a fragmentary perspective view showing the trimmer head in vertical position.

According to this invention, the hedge trimming apparatus 10 is shown to include base portion 11 having wheels 12 and a power plant 13. Secured to base 11 is a suitable handle 14 for manipulating apparatus 10. A U-shaped tubular member 15 is fixedly secured to base 11 by means of suitable fasteners 16 and a V-shaped brace 17 is fixedly secured to base 11 by means of suitable fasteners 18, the upper portion of brace 17 being secured fixedly to a hook portion 19 which is fixedly secured to the upper extremity of member 15 by means of a suitable fastener 20. A slideable sleeve member 21 is carried on each side or arm of member 15 and carried within the sleeve 21 is a tubular member 22 which is secured within the elevatable head 23 having the shears 24 for trimming hedges. A set screw 23' carried by head 23 provides a means of adjusting the angle of head 23 as shown in FIG. 2 of the drawings. A set screw 25 carried by the sleeves 21, provides a means of rendering the head 23 stationary at any desired elevation.

In use, the power plant 13 of base 11, provides power through the cable 26 so as to operate the shears 24.

Figure 1:
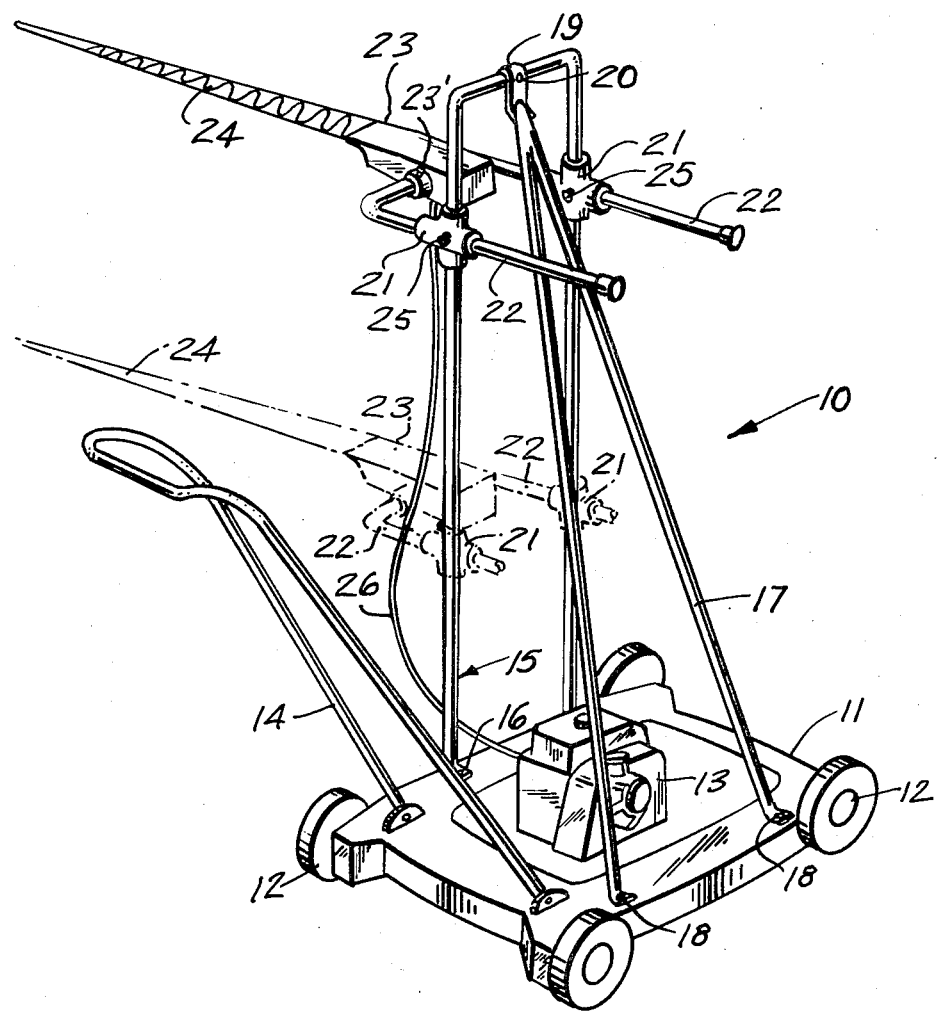
FIG. 1 is a perspective view of hhe present invention showing one position of the trimmer head in phantom lines.
Figure 3:
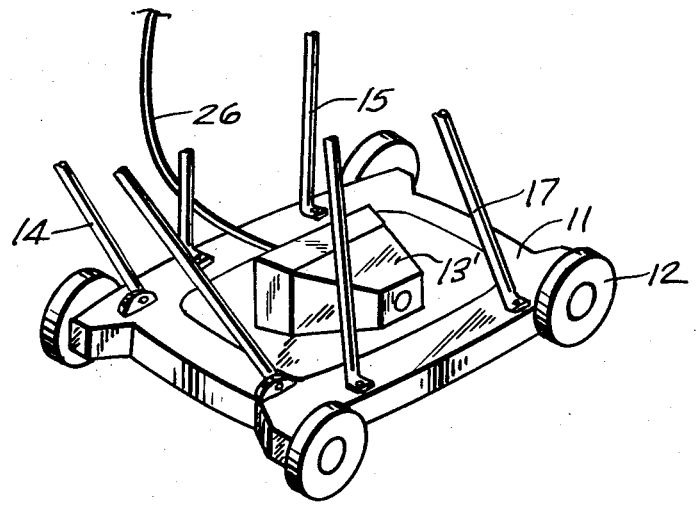
FIG. 3 is a fragmentary perspective view showing a modified form of power unit on a base portion of the apparatus.

As will be seen in FIG. 3 of the drawing, a motor 13' maybe used to power the head 23 instead of the power plant 13 shown in FIG. 1 of the drawing.

What I now claim is:

1. A mobile and variable height, hedge trimmer, comprising a base member, wheels and handle means carried by said base member providing mobility therefore, a power plant carried by said base member an inverted U-shaped tubular member longitudinally disposed on and carried by said base, brace means carried by said base and connected to said U-shaped member for holding same in a substantially upright position; sleeve means adjustably secured on each arm of said U-shaped member, a trimmer head having shear means, means having one portion secured to said sleeve means and having a spaced end portion adjustably supporting said trimmer head and drive means connected between said power plant and said shear means.

2. The combination according to claim 1, wherein said U-shaped member is fixedly secured to said base member by suitable fasteners at one side of said base member and said brace is V-shaped in configuration and is secured by suitable fasteners to the opposite side of said base portion of said device and the upper portion of said brace member is fixedly secured to a hook member engaging the upper extremity of said U-shaped member, said hook member being secured by suitable fastener means to said upper portion of said U-shaped member.

3. The combination according to claim 2, wherein said sleeve members are slidable upon the arms of said U-shaped member and are rendered secure thereto at any desired elevation by set screw members carried by each said sleeve and said supporting means includes tubular members that are secured within the head carrying the motor driven shears, said head having set screw means for adjusting the angle of said shears for vertical side cutting of hedges.

4. The combination according to claim 3, wherein said drive means includes a flexible cable connected at one end to said power plant and at the other end to said shear means.

* * * * *